(12) United States Patent
Keswani et al.

(10) Patent No.: US 9,627,928 B2
(45) Date of Patent: Apr. 18, 2017

(54) ELECTRICAL OUTLET HAVING WIRELESS CONTROL CAPABILITIES

(71) Applicant: IDEAL INDUSTRIES, INC., Sycamore, IL (US)

(72) Inventors: Sushil N. Keswani, Sycamore, IL (US); Nolan Bello, North Aurora, IL (US)

(73) Assignee: IDEAL Industries, Inc., Sycamore, IL (US)

(*) Notice: Subject to any disclaimer, the term of this patent is extended or adjusted under 35 U.S.C. 154(b) by 234 days.

(21) Appl. No.: 14/226,017

(22) Filed: Mar. 26, 2014

(65) Prior Publication Data

US 2014/0203638 A1 Jul. 24, 2014

Related U.S. Application Data

(63) Continuation-in-part of application No. 13/591,371, filed on Aug. 22, 2012.

(60) Provisional application No. 61/812,070, filed on Apr. 15, 2013, provisional application No. 61/812,548, filed on Apr. 16, 2013, provisional application No. 61/606,129, filed on Mar. 2, 2012.

(51) Int. Cl.
  *B23K 11/24* (2006.01)
  *H02J 13/00* (2006.01)

(52) U.S. Cl.
  CPC ....... *H02J 13/0075* (2013.01); *Y02B 90/2653* (2013.01); *Y04S 40/126* (2013.01); *Y10T 307/25* (2015.04)

(58) Field of Classification Search
  CPC ....... H02J 13/0075; H02J 3/00; Y04S 40/126; H05B 37/0272
  See application file for complete search history.

(56) References Cited

U.S. PATENT DOCUMENTS

| | | | |
|---|---|---|---|
| 7,749,018 B1* | 7/2010 | Benoit | H01R 25/003 174/58 |
| 8,674,616 B2* | 3/2014 | Holman | E04B 9/32 315/224 |
| 2006/0221522 A1* | 10/2006 | Furuta | H05B 37/0272 361/90 |
| 2007/0247086 A1* | 10/2007 | Chiu | H05B 39/044 315/291 |
| 2008/0195874 A1* | 8/2008 | Zhou | H02J 9/005 713/320 |
| 2009/0045676 A1* | 2/2009 | Rosendahl | B60L 3/0069 307/31 |
| 2010/0130142 A1* | 5/2010 | Schubert | H01R 13/66 455/90.3 |
| 2011/0175553 A1* | 7/2011 | Sampsell | H05B 37/0245 315/312 |

* cited by examiner

*Primary Examiner* — Daniel Cavallari
(74) *Attorney, Agent, or Firm* — Greenberg Traurig, LLP

(57) ABSTRACT

A line-in power is connectable to the disclosed outlet housing similar to any known power outlet. This provided power is used to drive an AC/DC converter to create a DC bus internal to the outlet housing. This DC bus powers the electronics, including, for example, a wireless transceiver incorporated within the outlet housing. In at least one instance, the wireless transceiver will receive a command from another wireless device to turn power ON or OFF to the local outlet and the downstream (e.g. daisychained, etc.) outlets. These outlets can be wired to the output terminations (push-in and/or other) on the back of the local outlet and/or outlet housing, or may be connected through any other suitable electrical connection.

17 Claims, 2 Drawing Sheets

ELECTRICAL OUTLET HAVING WIRELESS CONTROL CAPABILITIES

CROSS REFERENCE TO RELATED APPLICATION

This application is a non-provisional application claiming priority from U.S. Provisional Application Ser. No. 61/812,070, filed Apr. 15, 2013, entitled "Electrical Outlet Having Wireless Control Capabilities" and from U.S. Provisional Application Ser. No. 61/812,548, filed Apr. 16, 2013, entitled "Electrical Outlet Having Wireless Control Capabilities," each of which is incorporated herein by reference in its entirety.

This application is also a continuation-in-part of U.S. patent application Ser. No. 13/591,371 entitled "Connector Having Wireless Control Capabilities," filed Aug. 22, 2012, which is a non-provisional application claiming priority from U.S. Provisional Application Ser. No. 61/606,129 filed on Mar. 2, 2012 each of which is incorporated herein by reference in its entirety.

FIELD OF THE DISCLOSURE

The subject disclosure is generally related to electrical connectors and/or outlets, and more particularly, to an electrical outlet wireless control capabilities for use in connection with an AC power system.

BACKGROUND OF RELATED ART

U.S. patent application Ser. No. 13/591,371, incorporated herein in its entirety, describes an improved connector which, among other advantages, has the advantage of allowing for wireless control of the bringing of power to a low-voltage DC powered device that is coupled via use of the connector to a low-voltage DC power source. The disclosed connectors may be used to couple a low-voltage DC powered device to any one of a low-voltage DC power grid systems, to low-voltage DC power cables, and/or to other disconnection/connection points in a DC power system. When utilized in connection with a low-voltage DC power system, the subject connectors may be provided with one or more mechanical structures, such as those described in the above-noted patents, to thereby allow the subject connectors to be releasably attached thereto.

SUMMARY

The present disclosed examples generally provide a 120 Volt AC outlet that includes a wireless receiver/transmitter to switch power ON and OFF to the outlet locally and, at least in one example, also switch power to outlets that are daisychained and/or otherwise connected to the local outlet.

As described herein, the line-in power is connectable to the disclosed outlet housing similar to any known power outlet. This provided power is used to drive an AC/DC converter to create a DC bus internal to the outlet housing. This DC bus powers the electronics, including, for example, a wireless transceiver incorporated within the outlet housing. In at least one instance, the wireless transceiver will receive a command from another wireless device to turn power ON or OFF to the local outlet and the downstream (e.g. daisychained, etc.) outlets. These outlets can be wired to the output terminations (push-in and/or other) on the back of the local outlet and/or outlet housing, or may be connected through any other suitable electrical connection.

In still other examples, the housing and arrangement of the internal and/or external components of the present device may vary as desired. For example, in one instance, the device may be provided with a first housing comprising any and/or all of the wireless components and DC bus components, while a second housing may include the electrical outlet itself, with electrical connectivity to the wireless component housing and/or any downstream outlets.

While the foregoing provides a general description of the subject outlet, a better understanding of the objects, advantages, features, properties, and relationships of the subject outlet will be obtained from the following detailed description and accompanying drawing which set forth illustrative examples and which are indicative of the various ways in which the principles of the invention may be employed.

BRIEF DESCRIPTION OF THE DRAWINGS

For a better understanding of the present disclosure, reference may be had to the following drawings in which.

DETAILED DESCRIPTION

The following description of example methods and apparatus is not intended to limit the scope of the description to the precise form or forms detailed herein. Instead the following description is intended to be illustrative so that others may follow its teachings.

Figure 1:
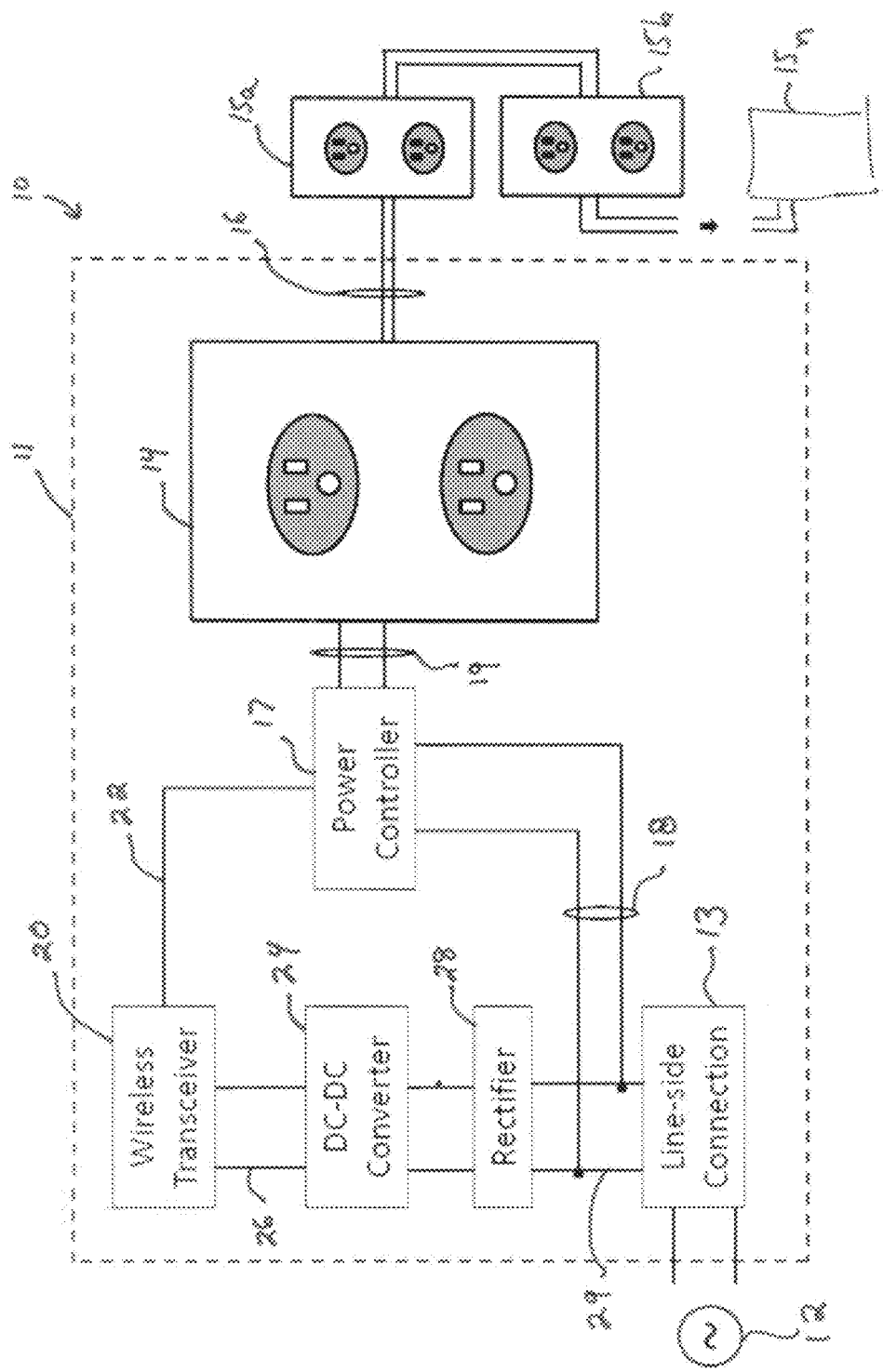
FIG. 1 illustrates a schematic diagram of example components of an outlet having wireless communication capabilities.

Turning now to the FIG. 1, a schematic diagram of an example outlet component 10 for use in bringing remotely switchable power from an AC power source 12 to an AC powered electrical outlet 14, and providing an AC power interface 16 to supply other AC powered devices 15a, 15b . . . 15n, such as other AC outlets, light fixtures, or the like, is illustrated.

For allowing the outlet component 10 to be coupled to the AC power source 12, the outlet component 10 includes a line-side connection 13 comprised of one or more electrical contacts arranged to allow engagement with corresponding electrical conductors or surfaces associated with the AC power source 12. The electrical contacts of the line-side connection 13 may be incorporated into a housing 11 having mechanical structures as needed to allow the outlet component 10 to be releasably attached to an AC power system, AC power wires, and/or to other disconnection/connection points in an AC power system. While not limiting, the wireless outlet component 10 may also be attached to wires associated with the source of AC power through use of insulation piercing type contacts (IPC type contacts), insulation displacing type contacts (IDC type contacts), push-in type contacts, crimp type contacts, weld type contacts, screw type contacts, etc.

For providing electrical power to an external device, the electrical outlet 14 is mounted within the housing 11. The electrical outlet 14 may be any suitable electrical outlet, including, for example, an AC power plug that uses the standards set by the U.S. National Electrical Manufacturers Association (NEMA), such as a NEMA 5-15R, which is the standard electricity outlet typically found in modern household and buildings in the United States. For allowing the outlet component 10 to be coupled to the AC powered devices 15*a*, 15*b*, the electrical outlet 14 includes a load-side interface comprises of one or more electrical contacts (not shown) (which one or more electrical contacts may be incorporated into the same or a further housing having mechanical structures as needed) adapted to be engaged with the AC power interface 16, plugs, or the like. Thus, without limitation, the electrical contacts of the electrical outlet 14 may also be push-in type contacts, IDC type contacts, IPC type contacts, crimp type contacts, weld type contacts, screw type, etc.

To control the bringing of power from the line-side connection 13 to the electrical outlet 14 and, in turn, to the AC power interface 16, and thus to the devices 15*a*, 15*b* . . . 15*n* coupled to the AC power interface 16, the outlet component 10 further includes a power controller 17. As illustrated in FIG. 1, the power controller 17 is electrically coupled to the line-side connection 13 via an electrical connection 18 and is electrically coupled to the electrical outlet 14 via an electrical connection 19. It will be appreciated that the electrical connection 19 may be directly electrically coupled to the AC power interface 16 or may be indirectly electrically coupled through the electrical outlet 14 as desired.

By way of example only, the power controller 17 may comprise a mechanical relay, or a semiconductor based electronic device such as an Opto-isolator, FET, transistor, and/or the like. The power controller 17 is further coupled to a wireless receiver or transceiver 20 which, as described hereinafter, functions to provide a control signal, such as a DC control signal to the power controller 17 via an electrical connection 22. While described in the present disclosure as a wireless receiver, such as, for example a 900 MHz, 2.4 GHz, etc. wireless receiver, the transceiver 20 may be any suitable receiver and/or addressable component as desired. Power is provided to the wireless receiver or transceiver 20 by any suitable electrical connections including, for instance by means of an optional DC-DC converter 24 which is electrically coupled to the wireless receiver or transceiver 20 via an electrical connection 26 and to the line-side connection 14 via a rectifier 28 and an electrical connection 29. It will be understood that other means for providing power to the wireless receiver or transceiver 20 could also be employed, such as by providing power through use of a battery, through use of ambient RF power harvesting, or the like. It will also be understood that the electrical connections between the various components illustrated in FIG. 1 may be traces formed on a PCB, wires, or the like without limitation.

More particularly, for controlling the bringing of power to electrical outlet 14, the wireless receiver or transceiver 20 is adapted to transmit a control signal to the power controller 17 via the electrical connection 22 in response to the wireless receiver or transceiver 20 receiving a control signal from a remotely located device, e.g., a switch, sensor, remote, controller, gateway, command center, or the like. Preferably, the remotely located device and the wireless receiver or transceiver 20 are adapted to communicate via use of wireless RF transmissions, such as for instance, via 900 MHz wireless transmissions. The power controller 17 is, in turn, adapted to respond to the control signal transmitted thereto via the electrical connection 22 to control the bringing of power to the electrical outlet 14 from the line-side connection 13 via the electrical connections 18 and 19. In this regard, the control signal provided to the power controller 17 by the wireless receiver or transceiver 20 may be used to simply turn on or turn off the power connection between the electrical outlet 14 and the line-side connection 13. It is contemplated that the control signal provided to the power controller 17 by the wireless receiver or transceiver 20 may also be used to limit the amount of power that is provided to the electrical outlet 14 from the line-side connection 13, e.g., to provide for a dimming effect. It will also be appreciated that, in the case when a transceiver 20 is utilized, the outlet component 10 may allow for state data associated with the power controller 17, and according the outlet 14, and/or other data to be communicated to other remotely located devices as needed.

While not illustrated, the outlet component 10 may additionally include a mechanism or other means to allow a user to set (or for pre-setting at a time of manufacture) an address to thereby allow communications to the outlet component 10, via the receiver or transceiver 20, to be specifically targeted thereto—which would be particularly useful in an instance where multiple connectors are intended to be used in a confined area. Still further, while not illustrated, the outlet component 10 may include a memory or other storage means to store operational data as desired. In addition, the power controller 17 may have a sensor and/or other suitable device to measure and monitor current draw and/or other measurement of consumption. This data may be stored locally and/or transmitted remotely to a command controller, etc. In this manner, the data may be utilized to obtain the status of power usage in a specific outlet 14, 14*a*, 14*b* . . . 14*n*, or to the entire combination of a subset thereto.

Figure 2:
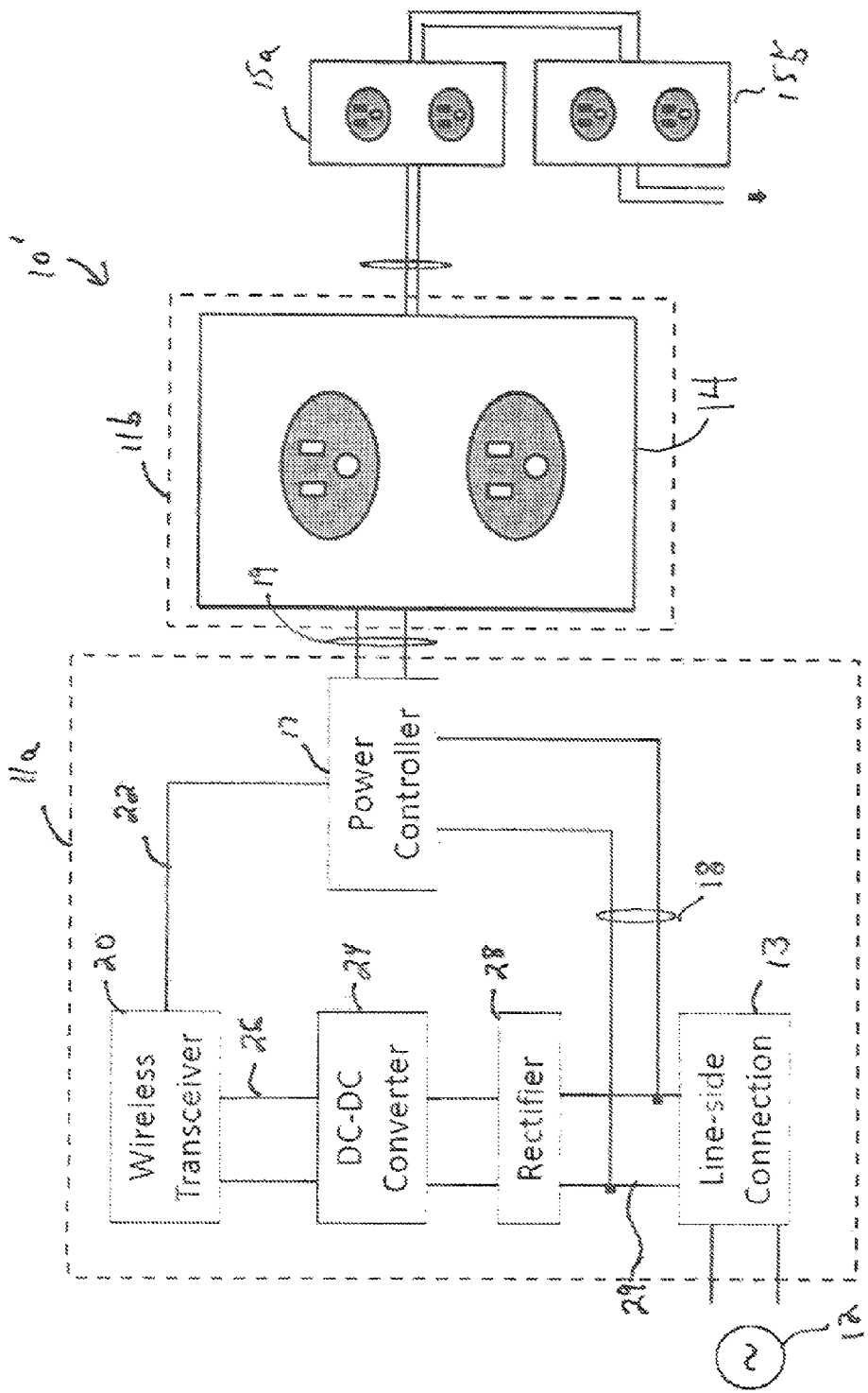
FIG. 2 illustrates another example schematic diagram of the example outlet of FIG. 1, showing various components in various housing arrangements.

Turning to FIG. 2, another example outlet component 10' is illustrated. In this example, the outlet component 10' includes multiple housings, 11*a*, 11*b*, which in his instance, house different individual components. For example, as illustrated, the example housing 11*a* includes each of the components from the line-side connection 1 to the power controller 17. Additionally, the housing 11*b* includes the electrical outlet 14 and the associated electrical connections. In this manner, the housing 11*a* may be used with any suitable electrical outlet, sensor, and/or other suitable electrical device, including other types of electrical outlets, to adapt, retrofit, and/or enable modification of existing or new outlets as desired. It will be appreciated by one of ordinary skill in the art that the housings 11, 11*a*, 11*b*, may include any other of the component elements described herein and/or any additional or substitute elements as desired.

While specific examples of the subject invention have been described in detail, it will be appreciated by those of ordinary skill in the art that various modifications and alternatives to those details could be developed in light of the overall teachings of this disclosure. It will therefore be appreciated that features described are not to be limited to any particular example but may be freely used across examples where applicable. Additionally, it will be appreciated that the size, shape, arrangement, integration, and/or number of components illustrated and described can be changed as necessary to meet a given need. Accordingly, the particular arrangements disclosed are meant to be illustrative only and not limiting as to the scope of the invention which is to be given the full breadth of the appended claims and any equivalents thereof.

We claim:

1. An electrical outlet component, comprising:
    a housing having a line-side connection interface arranged for electrically coupling the electrical outlet component to a source of electrical power and a load-side connection interface for electrically coupling the electrical outlet component to an electrical power receiving device;
    one or more US National Electrical Manufacturers Association (NEMA) outlets mounted within the housing, the one or more NEMA outlets being separate and distinct from the load-side connection interface;

a power controller electrically coupled to the line-side connection interface and the one or more NEMA outlets and operable to control a bringing of power to the one or more NEMA outlets and the load-side connection interface from the line-side connection; and a wireless receiver electrically coupled to the power controller for receiving a first signal from a device external to the outlet component and for generating, in response thereto, a second signal for controlling operations of the power controller.

2. The electrical outlet component as recited in claim 1, wherein the line-side connection interface is arranged for releasably and electrically coupling the outlet component to an AC power system.

3. The electrical outlet component as recited in claim 1, wherein the load-side connection interface comprises at least one of a push-in type wire contact, an IDC type wire contact, an IPC type wire contact, a crimp type wire contact, or a weld type wire contact for engaging a corresponding one or more wires associated with the electrical power receiving device.

4. The electrical outlet component as recited in claim 1, wherein the power controller functions as an on/off power controller.

5. The electrical outlet component as recited in claim 1, wherein the power controller functions as a dimming power controller.

6. The electrical outlet component as recited in claim 1, wherein the power controller comprises at least one of an Opto-isolator, an SCR, a FET, transistor, or a MEMS switch.

7. The electrical outlet component as recited in claim 1, comprising a DC-DC converter electrically coupled to the line-side connection interface and the receiver for providing power to the receiver.

8. The electrical outlet component as recited in claim 1, wherein the receiver is directly, electrically coupled to the line-side connection interface which provides power to the receiver.

9. The electrical outlet component as recited in claim 1, wherein the receiver is a wireless receiver.

10. The electrical outlet component as recited in claim 9 wherein the wireless received operates at at least one of approximately 900 MHz, or approximately 2.4 GHz.

11. The electrical outlet component as recited in claim 1, comprising a battery for providing power to the receiver.

12. The electrical outlet component as recited in claim 1, wherein the receiver comprises a transceiver.

13. The electrical outlet component as recited in claim 1, wherein the receiver is provided with an address.

14. The electrical outlet component as recited in claim 13, comprising an address setting device associated with the receiver.

15. The electrical outlet component as recited in claim 1, wherein the line-side connector comprises at least one of a push-in type wire contact, an IDC type wire contact, an IPC type wire contact, a crimp type wire contact, or a weld type wire contact for engaging a corresponding one or more wires associated with the source of electrical power.

16. The electrical outlet component as recited in claim 1, further comprising one or more sensors operably coupled to the one or more NEMA outlets to measure at least one operating parameter associated with use of the one or more NEMA outlets.

17. The electrical outlet component as recited in claim 16, wherein the wireless receiver is a transceiver, and wherein the sensed at least one operating parameter associated with use of the one or more NEMA outlets is transmitted via the transceiver to a remotely located device.

* * * * *